(12) United States Patent
Jones

(10) Patent No.: US 11,134,390 B2
(45) Date of Patent: *Sep. 28, 2021

(54) SPECTRUM SHARING SYSTEM FOR TELECOMMUNICATIONS NETWORK TRAFFIC

(71) Applicant: T-Mobile USA, Inc., Bellevue, WA (US)

(72) Inventor: David Jones, Bellevue, WA (US)

(73) Assignee: T-MOBILE USA, INC., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/848,539

(22) Filed: Apr. 14, 2020

(65) Prior Publication Data
US 2020/0245153 A1 Jul. 30, 2020

Related U.S. Application Data

(63) Continuation of application No. 16/181,249, filed on Nov. 5, 2018, now Pat. No. 10,694,394.
(Continued)

(51) Int. Cl.
*H04W 16/14* (2009.01)
*H04W 4/06* (2009.01)
(Continued)

(52) U.S. Cl.
CPC .......... *H04W 16/14* (2013.01); *H04W 4/06* (2013.01); *H04W 12/08* (2013.01);
(Continued)

(58) Field of Classification Search
None
See application file for complete search history.

(56) References Cited

U.S. PATENT DOCUMENTS

| 6,738,350 B1 | 5/2004 | Gao et al. |
| 2014/0206377 A1 | 7/2014 | Priotti |

(Continued)

FOREIGN PATENT DOCUMENTS

| KR | 20160074685 A | 6/2016 |
| WO | 2017133261 A1 | 8/2017 |

(Continued)

OTHER PUBLICATIONS

International Application No. PCT/US2018/059489, International Search Report and Written Opinion dated Feb. 25, 2019, 9 pages.
(Continued)

*Primary Examiner* — Saad Khawar
(74) *Attorney, Agent, or Firm* — Han Santos, PLLC

(57) ABSTRACT

This disclosure describes a spectrum sharing system that is configured to identify bandwidth allocation criteria for spectrum sharing at a base station node, which has a first cell configured for communications via a first spectrum and a second cell configured for communications via a second spectrum. The spectrum sharing system may further determine a select number of subframes on the second cell for configuration as Multicast Broadcast Single Frequency Network (MBSFN) subframes, based on the bandwidth allocation critical, and in doing so, generate spectrum sharing data for delivery to the base station node to dynamically configure the select number of subframes to support communications via the first spectrum.

20 Claims, 6 Drawing Sheets

Related U.S. Application Data

(60) Provisional application No. 62/582,236, filed on Nov. 6, 2017.

(51) Int. Cl.
*H04W 12/08* (2021.01)
*H04W 72/04* (2009.01)
*H04W 72/00* (2009.01)
*H04L 12/18* (2006.01)

(52) U.S. Cl.
CPC ..... *H04W 72/005* (2013.01); *H04W 72/0446* (2013.01); *H04L 12/189* (2013.01)

(56) References Cited

U.S. PATENT DOCUMENTS

| | | |
|---|---|---|
| 2016/0057504 A1 | 2/2016 | Shelby et al. |
| 2016/0295429 A1 | 10/2016 | Enqvist |
| 2018/0070369 A1 | 3/2018 | Papasakellariou |
| 2018/0152966 A1 | 5/2018 | Goldhamer |
| 2018/0192404 A1 | 7/2018 | Maaref et al. |
| 2018/0192426 A1 | 7/2018 | Ryoo et al. |
| 2018/0242163 A1 | 8/2018 | Patel et al. |
| 2018/0270815 A1 | 9/2018 | Bala et al. |
| 2018/0279303 A1* | 9/2018 | Sun ................... H04W 72/1278 |
| 2018/0323928 A1 | 11/2018 | Yang |
| 2018/0359337 A1* | 12/2018 | Kodaypak ............... H04L 43/08 |
| 2018/0367985 A1 | 12/2018 | Novlan et al. |
| 2019/0045401 A1 | 2/2019 | Zhang et al. |
| 2019/0053144 A1 | 2/2019 | Subramani et al. |
| 2019/0141695 A1 | 5/2019 | Babaei et al. |
| 2019/0207737 A1 | 7/2019 | Babaei et al. |
| 2019/0254110 A1 | 8/2019 | He et al. |
| 2019/0312702 A1 | 10/2019 | Yan et al. |
| 2019/0357264 A1 | 11/2019 | Yi et al. |
| 2019/0394790 A1 | 12/2019 | Damnjanovic et al. |
| 2020/0053758 A1 | 2/2020 | Hosseini et al. |
| 2020/0059407 A1* | 2/2020 | Lu ........................ H04W 28/16 |
| 2020/0084797 A1 | 3/2020 | Marjelund |
| 2020/0100137 A1 | 3/2020 | Panchal et al. |
| 2020/0154496 A1 | 5/2020 | Yi |
| 2020/0169998 A1 | 5/2020 | Kim et al. |
| 2020/0196326 A1 | 6/2020 | Li et al. |
| 2020/0245324 A1 | 7/2020 | Kim et al. |

FOREIGN PATENT DOCUMENTS

| | | |
|---|---|---|
| WO | 2017173133 A1 | 10/2017 |
| WO | 2018031746 A1 | 2/2018 |

OTHER PUBLICATIONS

U.S. Appl. No. 16/181,249, Notice of Allowance dated Jan. 6, 2020, 24 pages.
ZTE et al., 'Discussion on NR-LTE Co-existence'. R1-1701618, 3GPP TSG RAN WG 1 Meeting#88, Athens, Greece, Feb. 6, 2017 See pp. 1-4.
European Patent Application No. 19207989.5, Search Report dated Apr. 15, 2020, 6 pages.
U.S. Appl. No. 16/448,817, Office Action dated Oct. 26, 2020, 84 pages.
European Patent Application No. 18872293.8, Extended Search Report dated Mar. 25, 2021, 11 pages.
Huawei et al: "Coexistence of NR DL and LTE", 3GPP Draft; RI-1704198, 3rd Generation Partnership Project (3GPP), Mobile Competence Centre; 650, Route Des Lucioles ; F-06921 Sophia-Antipolis Cedex, France, vol. RAN WGl, No. Spokane, USA; Apr. 3, 2017-Apr. 7, 2017. Apr. 2, 2017 (Apr. 2, 2017), XP051242350, Retrieved from the Internet: URL:http://www.3gpp.org/ftp/ Meetings 3GPP SYNC/RANI/Docs/[retrieved on Apr. 2, 2017] * paragraph [0001]-paragraph [02.1] *.
U.S. Appl. No. 16/448,817, Notice of Allowance dated Mar. 17, 2021, 60 pages.

* cited by examiner

SPECTRUM SHARING SYSTEM FOR TELECOMMUNICATIONS NETWORK TRAFFIC

RELATED APPLICATIONS

This application claims priority to a commonly owned U.S. Provisional Patent Application No. 62/582,236 filed on Nov. 6, 2017, and titled "5G-NR and LTE co-existence in overlapping spectrum," and a commonly owned U.S. patent application Ser. No. 16/181,249, filed on Nov. 5, 2018, and titled "Spectrum Sharing System for Telecommunications Network Traffic," which are herein incorporated by reference in their entirety.

BACKGROUND

Telecommunication service providers typically support multiple generations of air-interface technologies at a given point in time. Through a process of spectrum re-farming, service providers may deploy a new air-interface technology that is intended to replace a previous generation of air-interface technology. Spectrum re-framing refers to the process of decommissioning one air interface associated with a previous generation of air-interface technology and deploying the next generation of air-interface technology in its place. Typically, spectrum re-framing of air-interface technology outpaces the gradual reduction in the number of old generation devices and the subsequent increase in the number of next-generation devices. As a result, the process of introducing a new generation of air-interface technology can be a laborious and costly upfront exercise.

However, more recent advances in air-interface technology permit previous and new generations of air-interface technologies to co-exist over a common, overlapping spectrum. Such advances permit service providers to avoid the laborious and costly upfront expense of decommissioning and re-purposing previous air-interface technology. Instead, previous and new generations of air-interface technology, such as Long-Term Evolution (LTE) and 5G-New Radio-LTE (5G NR-LTE) air-interface technologies can coexist within a common air-interface. In doing so, service providers may gradually deploy a new air-interface technology (i.e. NR-LTE) at a more gradual rate that mirrors market penetration of new user devices.

However, despite a co-existence of air-interface technologies, service providers are still tasked with ensuring that a shared spectrum does not compromise a user experience on either one of legacy and new user devices that supports a previous or new generation of air-interface technologies, and that a shared spectrum complies with regulatory and industrial network performance and efficiency criteria associated with the previous and new generation of air-interface technologies.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
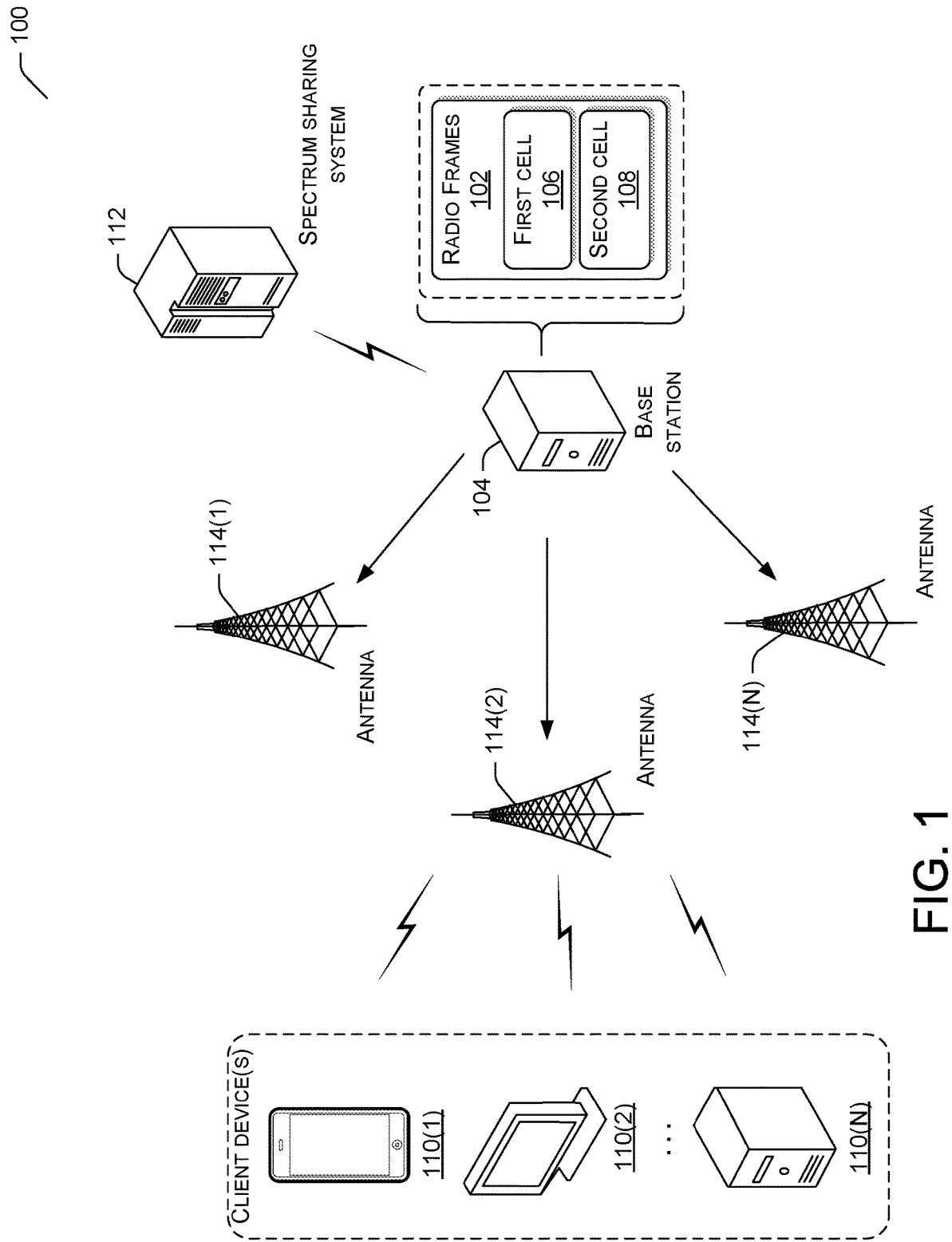
FIG. 1 illustrates a schematic view of a computing environment 100 that facilitates spectrum sharing between a first cell and a second cell of a base station node.

This disclosure describes techniques to facilitate a co-existence of overlapping spectrums within a base station node of a telecommunications network. More specifically, a spectrum sharing system is described that may employ static, semi-static, or dynamic techniques for spectrum re-framing of radio frames within a base station node. The term "spectrum re-framing" refers to a process of reserving a select number of subframes within a cell of a base station node as Multicast Broadcast Single Frequency Network (MBSFN) subframes and further configuring MBSFN subframes to facilitate communications via a different, overlapping spectrum.

The spectrum sharing system may be communicatively coupled to a base station node. The spectrum sharing system may be maintained by a base station node, or alternatively, communicatively coupled to the base station node via one or more network interfaces. The base station node may include a first cell and second cell. Each cell may include a plurality of subframes, each of which has a predetermined length. In one example, the predetermined length of a sub-frame may be 1 millisecond (ms), however, any predetermined length is possible. The spectrum sharing system may identify a select number of subframes of one cell that are configured to support a first spectrum and further reconfigure the select number of subframes as MBSFN frames to support a second spectrum.

By way of example, consider a base station node that is configured to support a first spectrum and a second spectrum. The first spectrum may correspond to a Long-Term Evolution (LTE) air-interface technology and the second spectrum may correspond to a 5G New Radio-LTE (5G NR-LTE) air-interface technology. The base station node may support each air-interface technology via a first cell and a second cell. The first cell may be configured to support the first spectrum (i.e. LTE) and the second cell may be configured to support the second spectrum (i.e. 5G NR-LTE). Moreover, the spectrum sharing system may determine that real-time network traffic associated with the first spectrum is greater than a bandwidth capacity of the first cell, and in doing so, initiate a spectrum reframing of the second cell (i.e. initially configured to support the second spectrum, namely 5G NR-LTE) to reserve a select number of subframes for communications via the overlapping, first spectrum (i.e. LTE). In this way, a combination of the first cell and a select number of subframes of the second cell can be used to facilitate communications via the first spectrum (i.e. LTE). Further, the remaining subframes of the second cell that were initially configured to support the second spectrum, namely 5G-NR, may continue to support the second spectrum.

As part of spectrum re-framing, a select number of subframes of a cell are identified to support another spectrum and then reconfigured as Multicast Broadcast Single Frequency Network (MBSFN) subframes or a similar derivative of subframes. An MBSFN subframe is a communication channel defined in the fourth-generation cellular networking standard for LTE air-interface technology. In other words, the MBSFN subframe may be configured to support a first spectrum air-interface technology that is different from a second spectrum air-interface technology that is typical for the cell. In response to re-configuring the select number of subframes as MBSFN subframes, the spectrum sharing system may transmit a message to a base station node to direct a portion of real-time network traffic associated with the first spectrum air-technology towards the MBSFN subframes. In this way, the cell that includes the MBSFN subframes may support the first spectrum via the MBSFN subframes and a second spectrum air interface technology via remaining subframes. In one example, the select number of subframes of the cell that are configured as MBSFN subframes may comprise a portion, but not all, of the subframes of the cell. Alternatively, the select number of subframes may comprise all of the subframes of the cell.

In some examples, spectrum re-framing may occur in a time domain, a frequency domain, or a combination of both. More specifically, the spectrum sharing system may be configured to identify a select number of subframes to re-configure as MBSFN subframes based on a static scheme that is based on market penetration of user devices associated with a first spectrum and a second spectrum (i.e. frequency domain), a semi-static scheme that is based on market penetration (i.e. frequency domain) and real-time network traffic data (i.e. time domain) associated with transmissions via the first spectrum and the second spectrum, or a dynamic scheme that is based on a real-time network traffic (i.e. time domain) associated with the first spectrum and the second spectrum.

In one example, the spectrum sharing system may perform spectrum re-framing based on a static scheme. The static scheme may reflect market penetration of user devices that support each air-interface technology. In a non-limiting example, a static scheme for a base station node may reflect an early market penetration of user devices that support 5G-NR air-interface technology. The static scheme may correspond to a new/old spectrum ratio of 2:1, however, any ratio is possible. In this example, the ratio of 2:1 may reflect twice the number of user devices that support the first spectrum (i.e. LTE) relative to user devices that support the second spectrum (i.e. 5G-NR). A ratio of 2:1, or a similar ratio, may be indicative of an early market penetration of user devices that support 5G-NR.

In a second non-limiting example, the spectrum sharing system may employ a semi-static scheme that not only reflects a market penetration of user devices that support the first spectrum (i.e. LTE) and the second spectrum (i.e. 5G NR-LTE) but also reflects network traffic associated with each air-interface technology at a base station node. In this example, network traffic may be based on historical network traffic data at the base station node or real-time network traffic data at the base station node. In a third-non-limiting example, the spectrum sharing system may employ a dynamic scheme that reflects real-time network traffic data transmitted via the base station node.

In various examples, the spectrum sharing system may further identify the select number of subframes for spectrum re-framing based at least in part on regulatory requirements or performance requirements imposed by industry standards or the service provider, itself. For example, a regulatory requirement may impose a requirement that a predetermined percentage of subframes are to be continuously dedicated to a particular spectrum, such as an LTE air-interface. Similarly, a service provider, or administrator of the spectrum sharing system, may impose a similar requirement to ensure that a threshold network efficiency is maintained for a particular spectrum. The predetermined percentage of subframes may be imposed by regulation, a service provider, or an administrator of the spectrum sharing system. The predetermined percentage may correspond to 70%, 80%, or 90%, however, any predetermined percentage of subframes is possible.

In one non-limiting example, the spectrum sharing system may monitor real-time network traffic through a base station node that includes a first cell that is configured to support a first spectrum, namely an LTE air-interface, and a second cell that is configured to support a second spectrum, namely a 5G-NR LTE air-interface. The spectrum sharing system may further detect an increase in real-time network traffic for one of the first spectrum (i.e. LTE) or the second spectrum (i.e. 5G-NR LTE), and in doing so, determine whether bandwidth capacities of the first cell and the second cell, respectively, can adequately transmit the real-time network traffic. For example, the spectrum sharing system may determine that a bandwidth requirement for the real-time network traffic associated with the first spectrum (i.e. LTE) exceeds the bandwidth capacity of the first cell. In doing so, the spectrum sharing system may identify a select number of subframes within the second cell to configure as MBSFN subframes, and further, configure the MBSFN subframes for facilitating communications via the first spectrum (I.e. LTE). In this way, the spectrum sharing system may generate a spectrum sharing data packet for transmission to the base station node that includes computer-executable instructions that dynamically configure the select number of subframes on the second cell as MBSFN subframes for spectrum sharing with the first spectrum (i.e. LTE). Further, the spectrum sharing system may transmit a message to the base station node to direct at least a portion of real-time network traffic associated with the first spectrum towards the MBSFN subframes on the second cell. The portion of real-time network traffic may correspond to a difference between the bandwidth requirement of the real-time network traffic associated with the first spectrum and the bandwidth capacity of the first cell, or a bandwidth capacity of the MBSFN subframes on the second cell, or a combination of both.

In this way, the portion of real-time network traffic that is associated with the first spectrum (i.e. LTE) can be accommodated by the first cell and the MBSFN subframes of the second cell of the base station node. Further, any additional portion of real-time network traffic that is associated with the second spectrum (i.e. 5G NR-LTE) can be accommodated by the subframes of the second cell—other than the MBSFN subframes.

In various examples, the spectrum sharing system may also determine the number of subframes of the first spectrum that are to be configured as MBSFN subframes based on one or more bandwidth allocation criteria. Bandwidth allocation criteria may include, but is not limited to, a regulatory requirement associated with a threshold bandwidth capacity for transmission of communications via a spectrum within the cell, or a threshold bandwidth capacity imposed by a service provider on a cell that is intended to ensure a network efficiency of the base station node. By way of example, bandwidth allocation criteria may correspond to a regulatory requirement that a predetermined percentage of subframes of a first cell be reserved for the air interface technology that the first cell was intended to support.

Moreover, the spectrum sharing system may monitor real-time network traffic on a continuous basis, per a predetermined schedule, or in response to a triggering event. The predetermined schedule may be based on a time interval of 15 minutes, 30 minutes, one hour, 12 hours, or 24 hours. Any time interval is possible. Further, the triggering event may correspond to receipt of an indication that real-time network traffic has exceeded a predetermined bandwidth capacity of a cell associated with the base station or receipt of an indication that network traffic congestion has occurred at a geographically adjacent base station node. Alternatively, or additionally, the triggering event may correspond to receipt of an indication that a remaining resource capacity of a first cell or a second cell of the base station node is less than a predetermined threshold. In this example, the predetermined threshold may be set by regulation, an operator of the spectrum sharing system, an administrator of the telecommunication network, or any combination thereof.

In some examples, the spectrum sharing system may employ one or more trained machine learning models to identify a select number of subframes of one cell that support a first spectrum, for reconfiguration to support a second spectrum based on historical network traffic data associated with the base station node over a predetermined time interval. Further, the spectrum sharing system may generate a network-congestion model based on historical network traffic data over a predetermined period of time. The spectrum sharing system may analyze real-time network traffic data using the network-congestion model to identify data patterns between the real-time network traffic and historical network traffic data. In doing so, the spectrum sharing system may identify an instance of historical network traffic data that conforms with real-time network data, and further determine a select number of subframes of a cell of the base station node to designate as MBSFN subframes. The network-congestion model may be based on a numerical distribution of data-points associated with historical network traffic data.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a schematic view of a computing environment 100 that facilitates spectrum sharing between radio frames 102 of a base station node 104. In the illustrated example, the base station node 104 may include a first cell 106 and a second cell 108. The base station node 104 is responsible for handling voice and data traffic between devices, such as client device(s) 110(1)-110(N), and the core network of the telecommunication network, via air interfaces. In the illustrated example, the base station node 104 may be configured to support client device(s) 110(1)-110(N) operating on an LTE spectrum and/or a 5G NR-LTE spectrum. More specifically, the base station node 104 may include a first cell 106 and a second cell 108.

In a non-limiting example, the first cell 106 may be configured to support a first spectrum, such as an LTE air-interface technology, and the second cell 108 may be configured to support a second spectrum, such as a 5G NR-LTE air-interface technology. Any combination of air-interface technologies is possible provided the air-interface technologies can co-exist within a common air-interface.

Additionally, the spectrum sharing system 112 may facilitate spectrum sharing between the first cell 106 and the second cell 108 of the base station node 104. The spectrum sharing system 112 may be configured to statically, semi-statically, or dynamically configure one or more subframes of a first cell 106 for spectrum sharing with the second spectrum associated with the second cell 108, or vice versa. In various examples, the spectrum sharing system 112 may monitor real-time network traffic associated with the first spectrum and the second spectrum, and in doing so, identify a select number subframes to configure as MBSFN subframes for spectrum sharing based at least in part on bandwidth requirements of the real-time network traffic.

In some examples, the spectrum sharing system 112 may be maintained by the base station node 104. In other examples, the spectrum sharing system 112 may be communicatively coupled to the base station node 104 via one or more network(s). The one or more network(s) may include public networks such as the Internet, private networks such as an institutional and/or personal intranet, or some combination of private and public networks. The one or more network(s) can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, LTE, 5G NR-LTE, and so forth), or any combination thereof.

Moreover, the spectrum sharing system 112 may operate on one or more computing device(s) that include one or more interfaces that enable communications with antennae 114(1)-114(N) and the core network of a telecommunications service provider.

In the illustrated example, a telecommunications service provider may provide telecommunications and data communications in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5G New Radio-LTE (5G NR-LTE), CDMA-2000 (Code Division Multiple Access 2000), and/or so forth. The computing environment 100 may include a core network that may provide telecommunication and data communication services to multiple computing devices, such as a 3G-compatible computing device and an LTE an LTE-compatible computing device, collectively referred to as computing device(s). Computing device(s) may include client device(s) 110(1)-110(N) and may correspond to any sort of electronic device operating on the telecommunications network, such as a cellular phone, a smartphone, a tablet computer, an electronic reader, a media player, a gaming device, a personal computer (PC, a laptop computer), etc. The computing device(s) may have a subscriber identity module (SIM), such as an eSIM, to identify the respective electronic device to a telecommunications service provider network (also referred to herein as "telecommunications network").

Additionally, the spectrum sharing system 112 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the client device(s) 110(1)-110(N) via one or more network(s).

Figure 2:
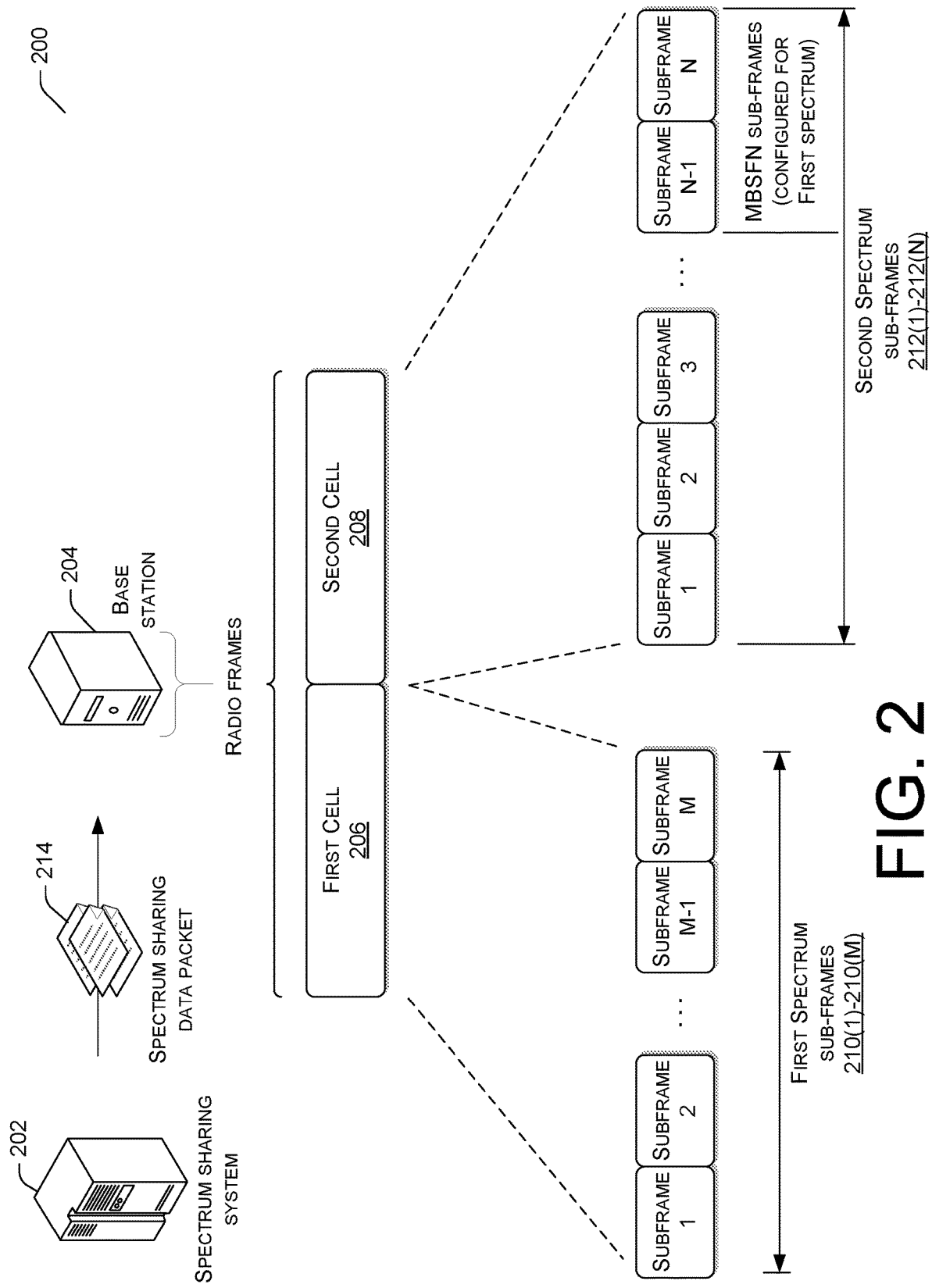
FIG. 2 illustrates a block diagram of a spectrum sharing system process that illustrates a spectrum sharing system communicatively coupled to a base station node.

FIG. 2 illustrates a block diagram of a spectrum sharing system process that illustrates a spectrum sharing system 202 communicatively coupled to a base station node 204. The spectrum sharing system 202 may correspond to spectrum sharing system 112, and base station node 204 may correspond to base station node 104. In the illustrated example, the base station node 204 includes a first cell 206 and a second cell 208. More specifically, the first cell 206 includes a plurality of subframes 210(1)-210(M). Each subframe may have a predetermined length. In one example, the predetermined length may be 1 millisecond (ms), however, any predetermined length is possible. In this example, the first cell 206 may be configured to support client devices operating on a first spectrum, such as an LTE air-interface technology. Further, the second cell 208 of the base station node 204 may include a plurality of subframes 212(1)-212(N) that are configured to support client devices on a second spectrum, such as a 5G NR-LTE air-interface technology. Similar to subframes 210(1)-210(M) of the first cell 206, each subframe of the second cell 208 may have any predetermined length, such as 1 ms.

Further, the spectrum sharing system 202 may transmit a spectrum sharing data packet 214 to the base station node 204. The spectrum sharing data packet 214 may include computer-executable instructions that dynamically designate a select number of subframes within one of the first cell 106 or the second cell 108 as MBSFN subframes. In the illustrated example, the spectrum sharing data packet 214 may designate a select number of subframes (i.e. subframe 'N-1' and subframe 'N' of FIG. 2) within the second cell 208 as MBSFN subframes, which may be further configured to support the first spectrum associated with the first cell 206.

In a first non-limiting example, the first cell 206 may be configured to service a first set of client devices operating on a first spectrum, such as an LTE air-interface technology, and the second cell 208 may be configured to service a second set of client devices operating on a second spectrum, such as a 5G NR-LTE air-interface technology. The spectrum sharing system 202 may determine that a bandwidth requirement associated with the first set of client devices operating on the first spectrum is greater than a bandwidth capacity of the first cell 206. In doing so, the spectrum sharing system 202 identify a select number of subframes on the second cell 208 to configure as MBSFN subframes (i.e. subframe 'N-1' and subframe 'N' of FIG. 2), and further configure the MBSFN subframes to support the first spectrum. In some examples, the spectrum sharing system 202 may consider bandwidth allocation criteria in selecting the number of subframes to configure as MBSFN subframes. Bandwidth allocation criteria may include a regulatory requirement associated with a threshold bandwidth capacity for transmissions via the second spectrum (i.e. 5G NR-LTE) within the second cell 208, or a service provider imposed threshold bandwidth capacity on the second cell 208 that is intended to ensure a network efficiency of communications via the second spectrum (i.e. 5G NR-LTE) on the second cell 208.

Additionally, the spectrum sharing system 202 may transmit computer-executable instructions to the base station node 204 that designate the select number of subframes (i.e. subframe 'N-1' and subframe 'N' of FIG. 2) within the second cell 208 as MBSFN subframes, and further configure the MBSFN subframes to support the first spectrum, LTE air-interface technology.

In a second non-limiting example, the first cell 206 may be configured to support a 5G-NR spectrum air-interface technology and the second cell 208 may be configured to support an LTE air-interface technology. In this example, the spectrum sharing system 202 may receive an indication that additional bandwidth is required for client devices operating on the LTE spectrum. In doing so, the spectrum sharing system 202 may transmit computer-executable instructions to the base station node 204 that designate a select number of subframes within the first cell 204 as MBSFN subframes to support the LTE spectrum.

Figure 3:
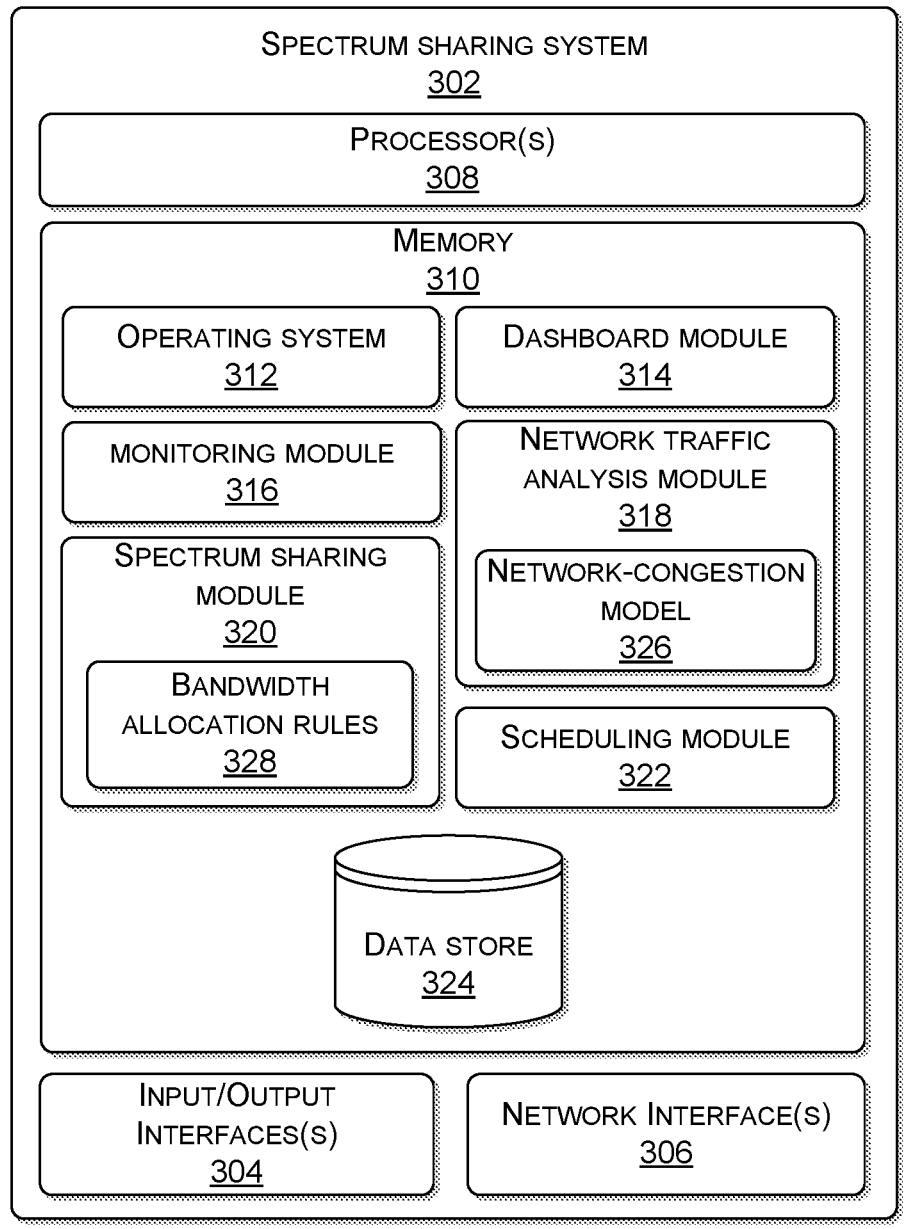
FIG. 3 illustrates a block diagram of various components of a spectrum sharing system.

FIG. 3 illustrates a block diagram of various components of a spectrum sharing system. The spectrum sharing system 302 may include routines, program instructions, objects, and/or data structures that perform particular tasks or implement abstract data types. Further, the spectrum sharing system 302 may include input/output interface(s) 304. The input/output interface(s) 304 may include any type of output interface known in the art, such as a display (e.g. a liquid crystal display), speakers, a vibrating mechanism, or a tactile feedback mechanism. Input/output interface(s) 304 also include ports for one or more peripheral devices, such as headphones, peripheral speakers, or a peripheral display. Further, the input/output interface(s) 304 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the spectrum sharing system 302 may include network interface(s) 306. The network interface(s) 306 may include any sort of transceiver known in the art. For example, the network interface(s) 306 may include a radio transceiver that performs the function of transmitting and receiving radio frequency communications via an antenna. In addition, the network interface(s) 306 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 306 may include wired communication components, such as an Ethernet port or a Universal Serial Bus (USB).

Further, the spectrum sharing system 302 may include one or more processor(s) 308 that are operably connected to memory 310. In at least one example, the one or more processor(s) 308 may be a central processing unit(s) (CPU), graphics processing unit(s) (GPU), both a CPU and GPU, or any other sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 308 may also be responsible for executing all computer applications stored in the memory, which can be associated with common types of volatile (RAM) and/or non-volatile (ROM) memory.

In some examples, memory 310 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 310 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 310 may include an operating system 312, a dashboard module 314, a monitoring module 316, a network traffic analysis module 318, a spectrum sharing module 320, a scheduling module 322, and a data store 324. The operating system 312 may be any operating system capable of managing computer hardware and software resources.

In the illustrated example, the dashboard module 314 may provide an operator of the spectrum sharing system 302 with an interface to input or adjust bandwidth allocation criteria, and data to define triggering events that may initiate a monitoring of real-time network traffic. Further, the dashboard module 314 may provide an operator of the spectrum sharing system 302 with scheduling information relating to transmitting a portion of real-time network traffic to an MBSFN frame.

Further, the monitoring module 316 may be configured to monitor real-time network traffic through a base station node. In some examples, the monitoring module 316 may monitor real-time network traffic on a continuous basis, per a predetermined schedule, or in response to a triggering event. The predetermined schedule may be based on a time interval of 15 minutes, 30 minutes, one hour, 12 hours, or 24 hours. Any time interval is possible. Further, the triggering event may correspond to receipt of an indication that real-time network traffic has exceeded a predetermined bandwidth capacity of a cell associated with the base station node.

Additionally, the network traffic analysis module 318 may analyze real-time network traffic data to determine whether a bandwidth requirement is associated with transmissions via a first spectrum and a second spectrum at the base station node. In doing so, the network traffic analysis module 318 may further determine whether the bandwidth requirement associated with a first spectrum is greater than a bandwidth capacity of a first cell associated with the first spectrum. In response to determining that the bandwidth requirement is greater than a bandwidth capacity, the network traffic analysis module 318 may transmit an indication to the spectrum sharing module 320 to configure a select number of subframes within a second cell as MBSFN subframes for spectrum sharing with the first spectrum.

In some examples, the network traffic analysis module 318 may analyze real-time network traffic statically, semi-statically, or dynamically. A static analysis may correspond to an analysis of relative market penetration for client devices that operate on the first spectrum or the second spectrum, via the base station node. A semi-static analysis may combine a market penetration analysis with an analysis of real-time network traffic transmitted via the base station node. A dynamic analysis may correspond to an analysis of real-time network traffic transmitted via the base station node.

Moreover, the network traffic analysis module 318 may employ one or more trained machine learning models to identify a select number of subframes of one cell that supports a first spectrum, for reconfiguration to support a second spectrum based on historical network traffic data associated with the base station node over a predetermined time interval. Further, the network traffic analysis module 318 may generate a network-congestion model 326 based on historical network traffic data over a predetermined time interval. The network traffic analysis module 318 may analyze real-time network traffic data using the network-congestion model 326 to identify data patterns between the real-time network traffic and historical network traffic data. In doing so, the network-congestion model 326 may identify an instance of historical network traffic data that conforms with real-time network data. In this instance, the network traffic analysis module 318 may transmit an indication of the instance of historical network traffic data to the spectrum sharing module 320 to configure a select number of subframes within a second cell as MBSFN subframes for spectrum sharing with the first spectrum. In various examples, the network-congestion model may be based on a numerical distribution of data-points associated with historical network traffic data.

Moreover, the spectrum sharing module 320 may receive an indication from the network traffic analysis module 318 indicating that spectrum sharing of a first spectrum or a second spectrum may be appropriate. In doing so, the spectrum sharing module 320 may use bandwidth allocation criteria 328 in selecting a number of subframes to configure as MBSFN subframes. Bandwidth allocation criteria 328 may include a regulatory requirement associated with a threshold bandwidth capacity for transmissions or a service provider imposed threshold bandwidth capacity that is intended to ensure a network efficiency of communications.

In a non-limiting example, the spectrum sharing module 320 may identify a select number of subframes on a second cell of a base station node to support a first spectrum associated with a first cell of the base station node. In this example, the spectrum sharing module 320 may identify the select number of subframes based on a difference between a bandwidth requirement associated with the first spectrum, the bandwidth capacity of the first cell associated with the first cell, and an available bandwidth capacity on the second cell. It is noteworthy that the available bandwidth capacity on the second cell is subject to a bandwidth requirement associated with the second spectrum on the second cell, and compliance with bandwidth allocation criteria, as noted earlier.

Further, the scheduling module 322 may generate a message for transmission to the base station node to schedule at least a portion of real-time network traffic associated with a first spectrum for transmission via MBSFN subframes on a second cell. The portion of real-time network traffic may correspond to a difference between the bandwidth requirement of the real-time network traffic associated with the first spectrum and the first cell, a bandwidth capacity of the MBSFN subframes on the second cell, or a combination of both. In some examples, the message may dynamically initiate a scheduling of the portion of real-time network traffic via MBSFN subframes. In other examples, the message may prompt an administrator or operator of the base station node to initiate the schedule.

Moreover, the data store 324 may include historical network traffic data that is captured by the base station node over a predetermined time interval. Further, the data store may also include data records that relate to market penetration of client devices associated with a first spectrum or a second spectrum that is serviced by the base station node. In some examples, the data store may include historical data records of market penetration for the purpose of extrapolating, via the network-congestion model 326 of the network traffic analysis module 318, changes in market penetration over a predetermined time interval.

Figure 4:
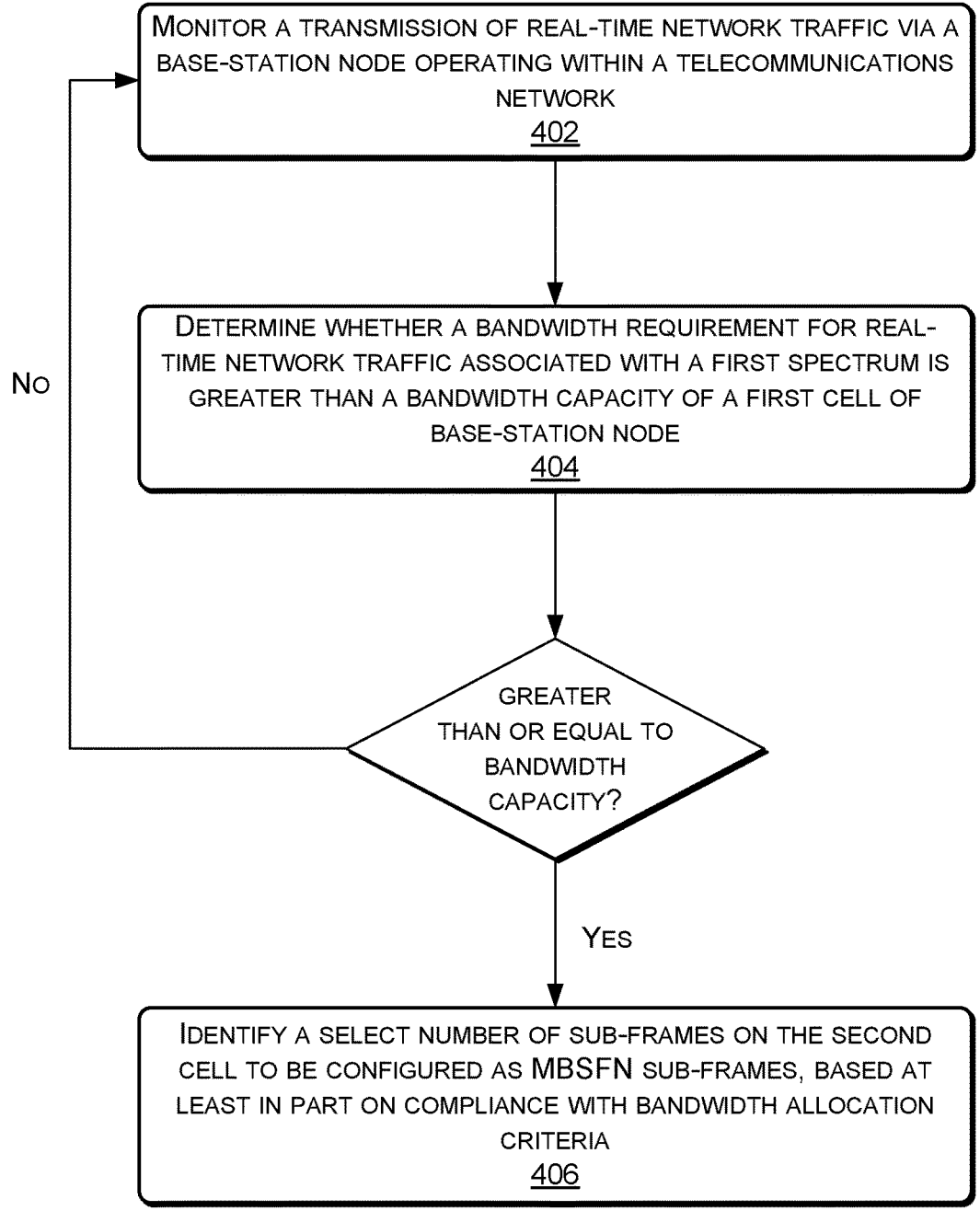
FIG. 4 illustrates a spectrum sharing process for selectively configuring subframes associated with a cell of a base station node as MBSFN subframes.
Figure 5:
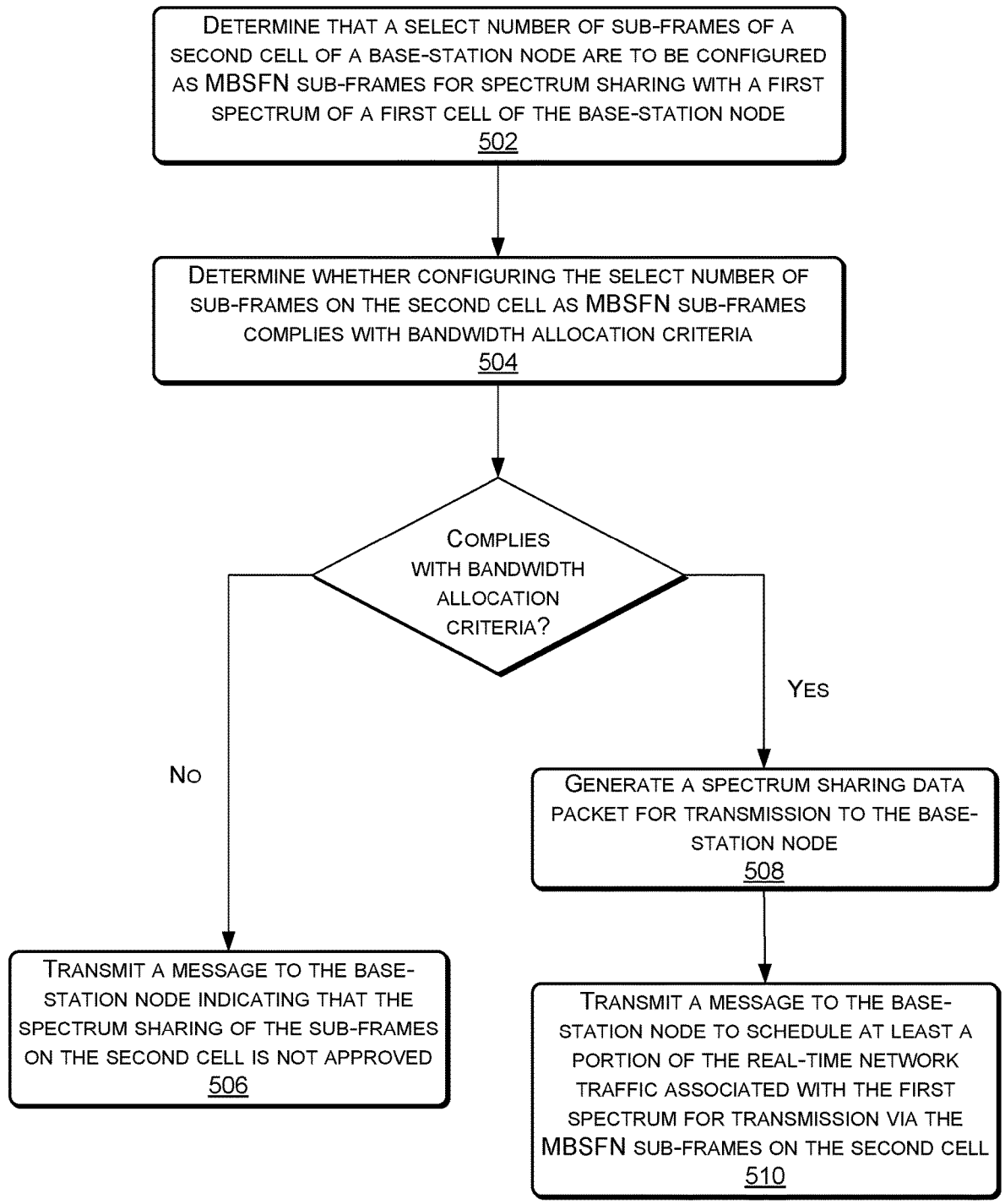
FIG. 5 illustrates a spectrum sharing process for generating a spectrum sharing data packet for transmission to a base station node based on compliance with bandwidth allocation criteria.
Figure 6:
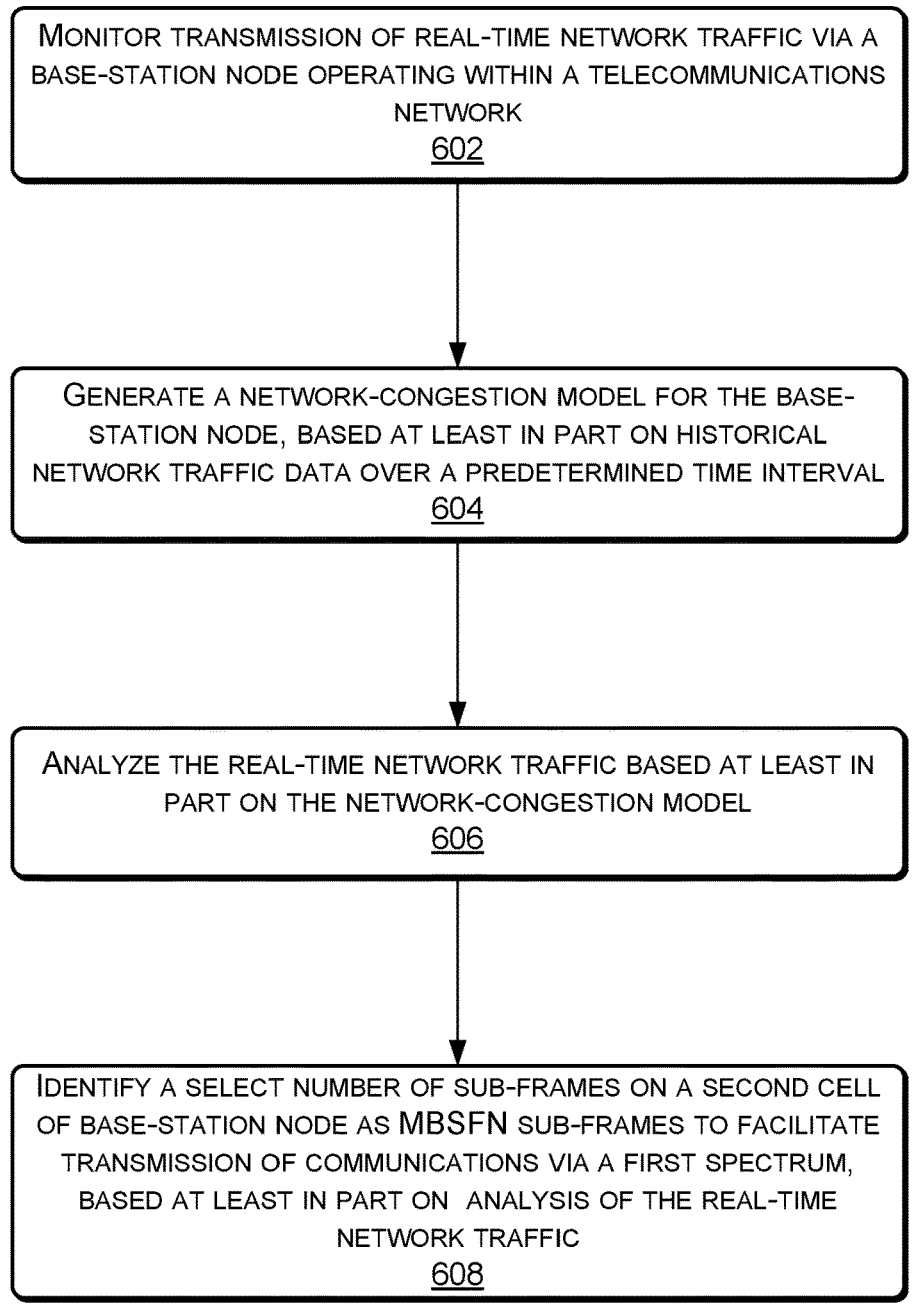
FIG. 6 illustrates a spectrum sharing process for generating a network-congestion model to analyze real-time network traffic data at a base station node.

FIGS. 4, 5, and 6 present processes 400, 500, and 600 that relate to operations of the Spectrum Sharing System. Each of processes 400, 500, and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, and 600 are described with reference to the computing environment 100 of FIG. 1.

FIG. 4 illustrates a spectrum sharing process for selectively configuring subframes associated with a cell of a base station node as MBSFN subframes. In this example, the base station node may include a first cell and a second cell. The first cell may be configured to support transmissions via a first spectrum and the second cell may be configured to support transmission via a second spectrum. The first spectrum and the second spectrum may correspond to any air-interface technologies that can coexist within a common air-interface, such as LTE and 5G NR-LTE.

At 402, the spectrum sharing system may monitor a transmission of real-time network traffic via a base station node operating within a telecommunications network. In some examples, the real-time network traffic may be associated with a first spectrum and a second spectrum. Further, the spectrum sharing system may monitor a transmission of real-time network traffic on a continuous basis, per a predetermined schedule, or in response to a triggering event. The triggering event may correspond to receipt of an indication that real-time network traffic has exceeded a predetermined bandwidth capacity of a cell associated with the base station node.

At 404, the spectrum sharing system may determine whether a bandwidth requirement for real-time network traffic associated with a first spectrum is greater than a bandwidth capacity of a first cell of the base station node. In some examples, the spectrum sharing system may analyze real-time network traffic statically, semi-statically, or dynamically, and further base a determination that a bandwidth requirement is greater than a bandwidth capacity based on such an analysis. A static analysis may correspond to an analysis of relative market penetration for client devices serviced by the base station node that operate on the first spectrum or the second spectrum. A semi-static analysis may combine a market penetration analysis with an analysis of real-time network traffic transmitted via the base station node. A dynamic analysis may correspond to an analysis of real-time network traffic transmitted via the base station node.

At 406, the spectrum sharing system may determine that the bandwidth requirement for the real-time network traffic associated with the first spectrum is greater than a bandwidth capacity of the first cell of the base station node. In doing so, the spectrum sharing system may identify a select number of subframes on the second cell to be configured as MBSFN subframes, based at least in part on compliance with bandwidth allocation criteria. The MBSFN subframes may be further configured to support communications via the first spectrum. In some examples, the bandwidth allocation criteria may include a regulatory requirement associated with a threshold bandwidth capacity for transmission of communications via a spectrum within a cell, or a service provider-imposed threshold bandwidth capacity on a cell that is intended to ensure a network efficiency of the base station node. By way of example, bandwidth allocation criteria may correspond to a regulatory requirement that a predetermined percentage of subframes within a cell be reserved for an initially designated spectrum.

Alternatively, the spectrum sharing system may determine that the bandwidth requirement for the real-time network traffic is less than the bandwidth capacity of the first cell of the base station node. In doing so, process 400 may return to step 402 and continue to monitor a transmission of real-time network traffic via the base station node.

FIG. 5 illustrates a spectrum sharing process for generating a spectrum sharing data packet for transmission to a base station node based on compliance with bandwidth allocation criteria. The spectrum sharing data packet is intended to configure a select number of subframes on a cell of the base station node to support a spectrum that requires an additional bandwidth allocation.

At 502, the spectrum sharing system may determine that a select number of subframes of a second cell of a base station node are to be configured as MBSFN subframes for spectrum sharing with a first spectrum that is supported by a first cell of the base station node. In some examples, the first spectrum and the second spectrum may correspond to an LTE air-interface technology and a 5G NR-LTE air-interface technology. Any combination of air-interface technologies is possible provided the air-interface technologies can coexist on a common air-interface.

At 504, the spectrum sharing system may determine whether configuring the select number of subframes on the second cell as MBSFN subframes complies with bandwidth allocation criteria. By way of example, bandwidth allocation criteria may correspond to a regulatory requirement that a predetermined percentage of subframes within a cell be reserved for an initially designated spectrum.

At 506, the spectrum sharing system may determine that configuring the select number of subframes on the second cell as MBSFN subframes does not comply with bandwidth allocation criteria. In doing so, the spectrum sharing system may generate and transmit a message to the base station node indicating that spectrum sharing of subframes on the second cell is not approved. In a non-limiting example, spectrum sharing of subframes on the second cell may not be approved because the select number of subframes would reduce an available bandwidth capacity on the second cell below a regulatory requirement to support transmissions via the second spectrum on the second cell.

At 508, the spectrum sharing system may determine that configuring the select number of subframes on the second cell as MBSFN subframes complies with bandwidth allocation criteria. In this example, the spectrum sharing system may further generate a spectrum sharing data packet for transmission to the base station node. The spectrum sharing data packet may include computer executable instructions that dynamically configure the select number of subframes on the second cell as MBSFN subframes for spectrum sharing with the first spectrum.

At 510, the spectrum sharing system may generate and transmit a message to the base station node to schedule at least a portion of real-time network traffic associated with the first spectrum for transmission via the MBSFN subframes on the second cell. The portion of real-time network traffic may correspond to a difference between the bandwidth requirement of the real-time network traffic associated with the first spectrum and the first cell, a bandwidth capacity of the MBSFN subframes on the second cell, or a combination of both.

FIG. 6 illustrates a spectrum sharing process for generating a network-congestion model to analyze real-time network traffic data at a base station node. In doing so, the spectrum sharing system may further identify a select number of subframes on a cell of the base station node to configure as MBSFN subframes.

At 602, the spectrum sharing system may monitor a transmission of real-time network traffic via a base station node operating within a telecommunications network. In some examples, the real-time network traffic may include transmissions via a first spectrum and a second spectrum. Further, the spectrum sharing system may monitor a transmission of real-time network data based at least in part on an indication that network traffic congestion has occurred at a geographically adjacent base station node.

At 604, the spectrum sharing system may generate a network-congestion model for the base station node, based at least in part on historical network traffic data captured over a predetermined time interval. The network-congestion model may be based on a numerical distribution of datapoints associated with historical network traffic data.

At 606, the spectrum sharing system may analyze the real-time network traffic based at least in part on the network congestion model. In some examples, the spectrum sharing system may analyze real-time network traffic data using the network-congestion model to identify data patterns between the real-time network traffic and historical network traffic data. In doing so, the spectrum sharing system may identify an instance of historical network traffic data that conforms with real-time network data.

In a non-limiting example, the analysis of the real-time network traffic may determine that the bandwidth requirement associated with the first spectrum is greater than a bandwidth capacity of the first cell.

At 608, the spectrum sharing system may identify a select number of subframes on the second cell to be configured as MBSFN subframes, based at least in part on compliance with bandwidth allocation criteria. The MBSFN subframes may be further configured to support communications via the first spectrum. In this example, the spectrum sharing system may further generate a spectrum sharing data packet that includes computer-executable instructions that dynamically configure the select number of subframes on the second cell as MBSFN subframes, and further configure the MBSFN subframes to support communications via the first spectrum.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system comprising:
one or more processors;
memory coupled to the one or more processors, the memory including one or more modules that are executable by the one or more processors to:
identify bandwidth allocation criteria for spectrum sharing at a base station node, the base station node including a first cell that is configured for communications via a first spectrum and a second cell that is configured for communications via a second spectrum;
retrieve, from a data repository, historical network traffic data associated with the first cell and the second cell;
determine a bandwidth requirement for communications via the first cell and the second cell, based at least in part on the historical network traffic data;
determine a select number of subframes on the second cell for configuration as Multicast Broadcast Single Frequency Network (MBSFN) subframes to support communications via the first spectrum, based at least in part on the bandwidth allocation criteria and the bandwidth requirement; and
generate spectrum sharing data for delivery to the base station node to dynamically con figure the select number of subframes to support communications via the first spectrum.

2. The system of claim 1, wherein the bandwidth allocation criteria corresponds to a regulatory requirement that imposes a threshold bandwidth requirement for communications via at least one of the first spectrum or the second spectrum.

3. The system of claim 1, wherein the bandwidth allocation criteria corresponds to a service-provider-imposed threshold bandwidth requirement for communications via at least one of the first spectrum or the second spectrum.

4. The system of claim 1, wherein the one or more modules are further executable by the one or more processors to:
analyze real-time network traffic at the base station node, and
wherein to determine the select number of subframes is further based at least in part on the real-time network traffic.

5. The system of claim 1, wherein the one or more modules are further executable by the one or more processors to:
transmit a message to the base station node to schedule at least a portion of real-time network traffic via associated with the first spectrum via the MBSFN subframes.

6. The system of claim 1, wherein the first spectrum corresponds to Long-Term Evolution (LTE) and the second spectrum corresponds to 5G-New Radio (5G-NR).

7. The system of claim 1, wherein the one or more modules are further executable by the one or more processors to:
receive an indication of network traffic congestion an additional base station node that is geographically adjacent to the base station node, the network traffic congestion corresponding to one of the first spectrum or the second spectrum, and
wherein, to determine the select number of subframes on the second cell for configuration as MBSFN subframes is further based at least in part on the indication of network traffic congestion.

8. A computer-implemented method, comprising:
under control of one or more processors:
monitoring real-time network traffic at base station node operating within a telecommunications network, the base station node including a first cell that is configured for communications via a first spectrum and a second cell that is configured for communications via a second spectrum;
retrieving, from a data repository, historical network traffic data associated with the first spectrum or the second spectrum at the base station node;
analyzing the real-time network traffic to identify data patterns with the historical network traffic data;
determining a select number of subframes on the second cell for configuration as Multicast Broadcast Single Frequency Network (MBSFN) subframes to support communications via the first spectrum, based at least in part analysis of the real-time network traffic; and
generating spectrum sharing data for delivery to the base station node to dynamically configure the select number of subframes to support communications via the first spectrum.

9. The computer-implemented method of claim 8, further comprising:
identifying bandwidth allocation criteria for spectrum sharing at the base station node, and
wherein, determining the select number of subframes on the second cell for configuration as MBSFN subframes is further based at least in part on the bandwidth allocation criteria.

10. The computer-implemented method of claim 9, wherein the bandwidth allocation criteria corresponds to one of a regulatory requirement or a network-imposed efficiency requirement.

11. The computer-implemented method of claim 8, wherein the first spectrum corresponds to 5G-New Radio (5G-NR) and the second spectrum corresponds to Long-Term Evolution (LTE).

12. The computer-implemented method of claim 8, further comprising:
determining whether real-time network traffic for communications via the first spectrum is greater than or equal to a bandwidth capacity of the first cell, and
wherein, determining the select number of subframes on the second cell for configuration as MBSFN subframes is further based at least in part on the real-time network traffic via the first spectrum being greater than the bandwidth capacity of the first cell.

13. One or more non-transitory computer-readable media storing computer-executable instructions that, when executed on one or more processors, cause the one or more processors to perform acts comprising:
determining a remaining resource capacity of a first cell of a base station node;
monitoring real-time network traffic at the base station node;
determining a select number of subframes on a second cell of the base station node for configuration as Multicast Broadcast Single Frequency Network (MBSFN) subframes to support communications via the first spectrum, based at least in part on the remaining resource capacity being less than a predetermined threshold; and
generating spectrum sharing data for delivery to the base station node to dynamically configure the select number of subframes to support communications via the first spectrum.

14. The one or more non-transitory computer-readable media of claim 13, further comprising:
receiving an indication of additional real-time network traffic data at a geographically-adjacent base station node; and
monitoring real-time network traffic at the base station node in response to receipt of the indication, and
wherein, determining the select number of subframes on the second cell for configuration as MBSFN subframes is further based at least in part on the real-time network traffic.

15. The one or more non-transitory computer-readable media of claim 13, further comprising:
quantifying a portion of real-time network traffic associated with the first spectrum for transmission via the MBSFN subframes; and
transmitting a message to the base station node to schedule the portion of real-time network traffic for transmission via the MBSFN subframes.

16. The one or more non-transitory computer-readable media of claim 13, further comprising:
monitoring real-time network traffic at the base station node; and
determining a bandwidth requirement for communications via the second spectrum, based at least in part on the real-time network traffic, and
wherein, determining the select number of subframes on the second cell for configuration as MBSFN subframes is based at least in part on the bandwidth requirement.

17. The one or more non-transitory computer-readable media of claim 13, wherein the acts further comprise:
retrieving, from a data store, bandwidth allocation criteria associated with spectrum sharing between a first spectrum on the first cell and the second cell, and
wherein, determining the select number of subframes on the second cell is further based at least in part on the bandwidth allocation criteria.

18. The one or more non-transitory computer-readable media of claim 17, wherein the bandwidth allocation criteria corresponds to at least one of a regulatory requirement that imposes a threshold bandwidth requirement for communications via at least one of the first spectrum or the second spectrum.

19. The one or more non-transitory computer-readable media of claim 17, wherein the bandwidth allocation criteria corresponds to a service-provider-imposed threshold bandwidth requirement for communications via at least one of the first spectrum or the second spectrum.

20. The one or more non-transitory computer-readable media of claim 13, wherein the first spectrum corresponds to Long-Term Evolution (LTE) and the second spectrum corresponds to 5G-New Radio (5G-NR).

* * * * *